United States Patent
Chaganti et al.

(10) Patent No.: US 11,658,970 B2
(45) Date of Patent: May 23, 2023

(54) COMPUTING DEVICE INFRASTRUCTURE TRUST DOMAIN SYSTEM

(71) Applicant: Dell Products L.P., Round Rock, TX (US)

(72) Inventors: Ravikanth Chaganti, Bangalore (IN); Dharmesh M. Patel, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 286 days.

(21) Appl. No.: 17/019,523

(22) Filed: Sep. 14, 2020

(65) Prior Publication Data
US 2022/0086148 A1    Mar. 17, 2022

(51) Int. Cl.
*H04L 9/40*    (2022.01)
*H04L 9/32*    (2006.01)

(52) U.S. Cl.
CPC ........ *H04L 63/0876* (2013.01); *H04L 9/3236* (2013.01)

(58) Field of Classification Search
CPC .............. H04L 63/0876; H04L 9/3236; H04L 63/104; H04L 63/08; H04L 9/0861; H04L 43/10; H04L 43/12; H04L 43/20; H04L 41/12; H04L 41/122; H04L 41/40; H04L 41/0893; H04L 67/1097; G06F 3/067;
(Continued)

(56) References Cited

U.S. PATENT DOCUMENTS

| 9,521,635 | B1 * | 12/2016 | Lambert | ............... H04W 76/11 |
| 9,860,862 | B1 * | 1/2018 | Lambert | ............... H04W 48/16 |
| 10,284,375 | B2 * | 5/2019 | Thom | ..................... G06F 21/53 |

(Continued)

FOREIGN PATENT DOCUMENTS

DE    102020111199 A1 *  10/2020    ......... G06F 11/1448

OTHER PUBLICATIONS

"Time-based One-time Password algorithm; From Wikipedia, the free encyclopedia" This Page was last edited on Aug. 23, 2020, at 11:26 (UTC), 3 pages, printed from https://en.wikipedia.org/wiki/Time-based_One-time_Password_algorithm on Sep. 9, 2020.

*Primary Examiner* — Tae K Kim
(74) *Attorney, Agent, or Firm* — Joseph Mencher

(57) ABSTRACT

A computing device infrastructure trust domain system includes first and second computing devices included in a computing device infrastructure system. The second computing device stores authentication information specific to the computing device infrastructure system, and operates to receive a first communication broadcast by the first computing device, verify that the first communication includes the authentication information and, in response, add the first computing device to a trust domain and store a first computing device component hash value included in the first communication. When the second computing device subsequently receives a second communication from the first computing device, it determines whether the second communication includes the first computing device component hash value: If so, the second computing device removes the first computing device from the trust domain, if not, the second computing device performs at least one trust domain operation associated with the first computing device.

20 Claims, 11 Drawing Sheets

(58) Field of Classification Search
CPC ............... H04W 84/12; H04W 56/001; H04W 56/0015; H04W 56/0025
USPC .......................................................... 726/7
See application file for complete search history.

(56) References Cited

U.S. PATENT DOCUMENTS

| | | | | |
|---|---|---|---|---|
| 2004/0032844 | A1* | 2/2004 | Lewis | H04W 8/12 |
| | | | | 455/433 |
| 2008/0263189 | A1* | 10/2008 | Begorre | H04L 63/0876 |
| | | | | 709/223 |
| 2013/0223278 | A1* | 8/2013 | Inada | H04W 12/50 |
| | | | | 370/254 |
| 2015/0234619 | A1* | 8/2015 | Ozawa | G06F 3/0617 |
| | | | | 710/74 |
| 2015/0341329 | A1* | 11/2015 | Mosko | H04L 63/08 |
| | | | | 726/3 |
| 2016/0285630 | A1* | 9/2016 | Abraham | H04L 9/3242 |
| 2016/0366124 | A1* | 12/2016 | Benoit | H04L 63/0442 |
| 2020/0106774 | A1* | 4/2020 | Lerch | G07C 9/28 |

* cited by examiner

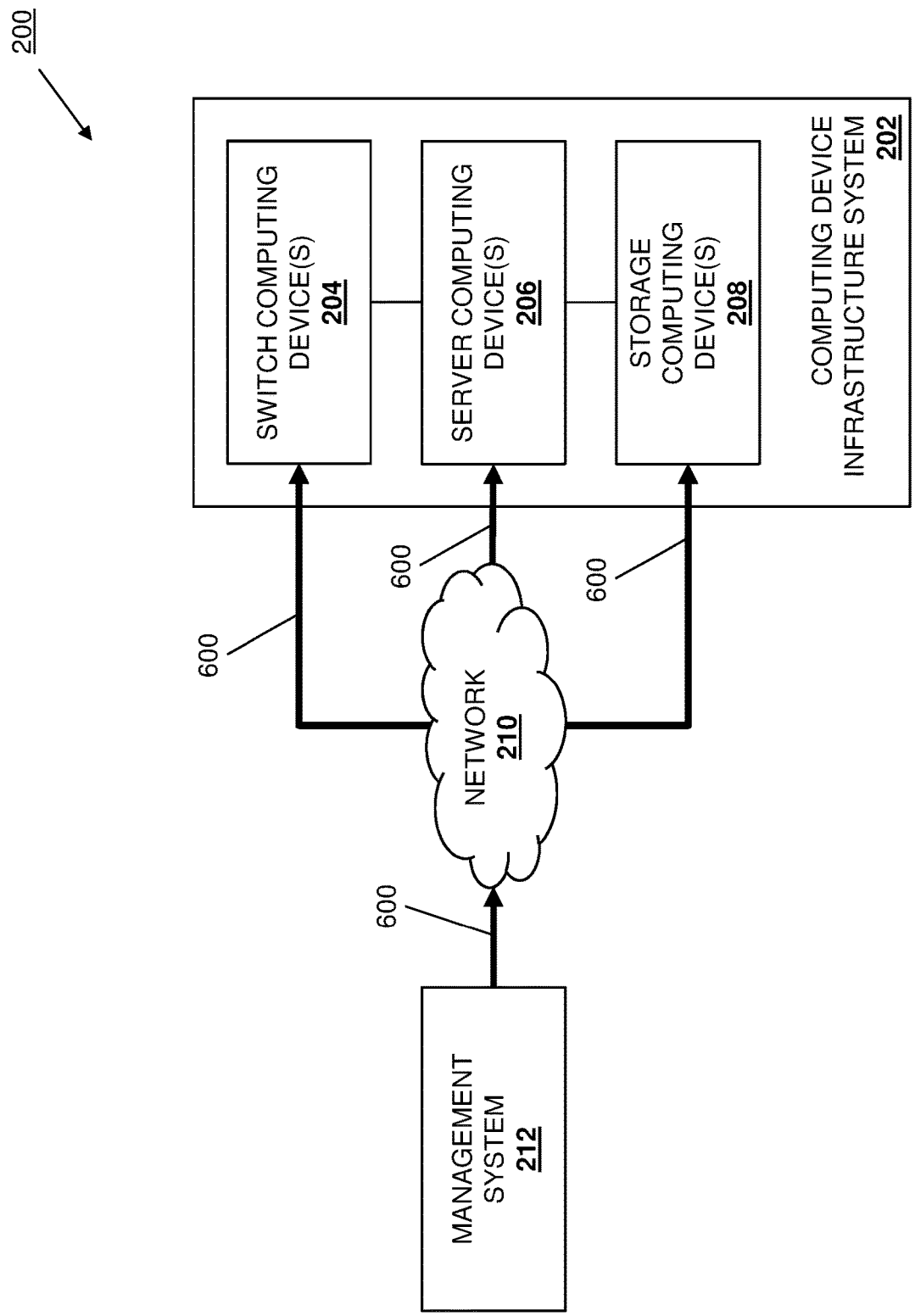

COMPUTING DEVICE INFRASTRUCTURE TRUST DOMAIN SYSTEM

BACKGROUND

The present disclosure relates generally to information handling systems, and more particularly to providing a trust domain for information handling systems included in a computing device infrastructure system.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems are sometimes utilized to provide computing device infrastructure systems such as, for example, Hyper-Converged Infrastructure (HCI) systems, which one of skill in the art in possession of the present disclosure will recognize provides a software-defined Information Technology (IT) infrastructure that virtualizes the elements of conventional hardware-defined systems in order to perform workloads, run virtual machines, and/or perform other hyper-converged infrastructure operations known in the art. For example, server computing device(s), switch computing device(s), and/or storage computing device(s) may be configured in a hyper-converged infrastructure system to provide virtualized computing functionality (e.g., via a hypervisor or other virtualized computing component), virtualized/software-defined networking, and/or software-defined storage. The conventional deployment/configuration and/or management of such hyper-converged infrastructure systems and other computing device infrastructure systems can raise some issues.

Hyper-converged infrastructure deployment/configuration and/or management requires the integration of the server computing device(s), switch computing device(s), and/or storage computing device(s) discussed above, and conventional deployment/configuration and/or management of hyper-converged infrastructure systems utilize relatively prescriptive deployment steps in order to enable automated deployment of hyper-converged infrastructure systems. For example, conventional automation controllers utilized in conventional deployment/configuration and management of hyper-converged infrastructure systems may be provided predefined authentication and authorization mechanisms in which the target credentials are already known, which allows authentication to target devices, followed by the performance of tasks to complete the discovery, deployment, and/or life cycle management for the computing devices in the hyper-converged infrastructure system (a scenario that is typical with regard to "bare metal" management tasks).

However, the automated conventional deployment/configuration and/or management of hyper-converged infrastructure systems can become challenging outside of an engineered systems context such as, for example, when the server computing device(s) are ordered with random management controller passwords that will not be known until an administrator manually provides them as an input parameter, when the switch computing devices and/or storage computing devices ship with different sets of default credentials that may differ from device model to device model, between device generations, and/or between operating system versions, and/or due to a variety of other scenarios that would be apparent to one of skill in the art in possession of the present disclosure. As such, for "Do-It-Yourself (DIY)" hyper-converged infrastructure systems and/or hyper-converged infrastructure systems provided at the edge of a network, automated deployment/configuration and/or management of those hyper-converged infrastructure systems (as well as automated management solutions provided by the customer for post-"day-0" deployments) may be complicated due to the differing credentials, model/generation variations, and/or other automated deployment/configuration/management complications that would be apparent to one of skill in the art in possession of the present disclosure. Conventional solutions to such issues include the deployment/configuration/management engineers deploying the hyper-converged infrastructure system manually, or using tools to first identify and update the credentials manually to allow some automated configuration operations. As such, fully automated deployment/configuration/management of hyper-converged infrastructure systems is often unavailable, thus increasing the time and costs associated with the deployment/configuration/management of the hyper-converged infrastructure systems.

Accordingly, it would be desirable to provide a computing device infrastructure trust domain system that addresses the issues discussed above.

SUMMARY

According to one embodiment, an Information Handling System (IHS) includes a processing system; and a memory system that is coupled to the processing system and that includes instructions that, when executed by the processing system, cause the processing system to provide a trust domain engine that is configured to: receive a first communication broadcast by a first computing device; verify that the first communication includes authentication information that is specific to a computing device infrastructure system and, in response: add the first computing device to a trust domain; and store a first computing device component hash value that is included in the first communication; receive, subsequent to the first communication, a second communication from the first computing device; and determine whether the second communication includes the first computing device component hash value and: remove, in response to determining that the second communication does not include the first computing device component hash value, the first computing device from the trust domain; and perform, in response to determining that the second communication includes the first computing device component hash value, at least one trust domain operation associated with the first computing device.

BRIEF DESCRIPTION OF THE DRAWINGS

FIG. 6 is a schematic view illustrating an embodiment of the operation of the computing device infrastructure trust domain system of FIG. 2 during the method of FIG. 4.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
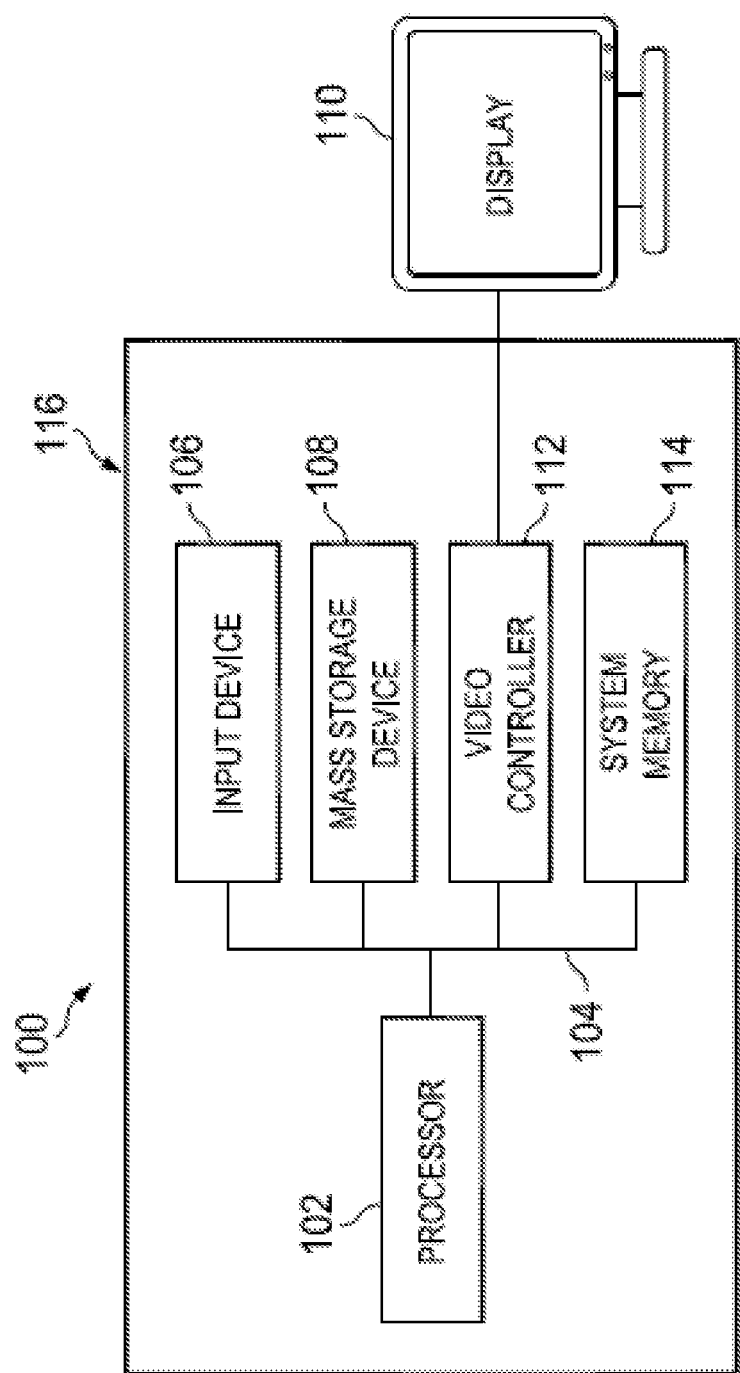
FIG. 1 is a schematic view illustrating an embodiment of an Information Handling System (IHS).

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety of other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
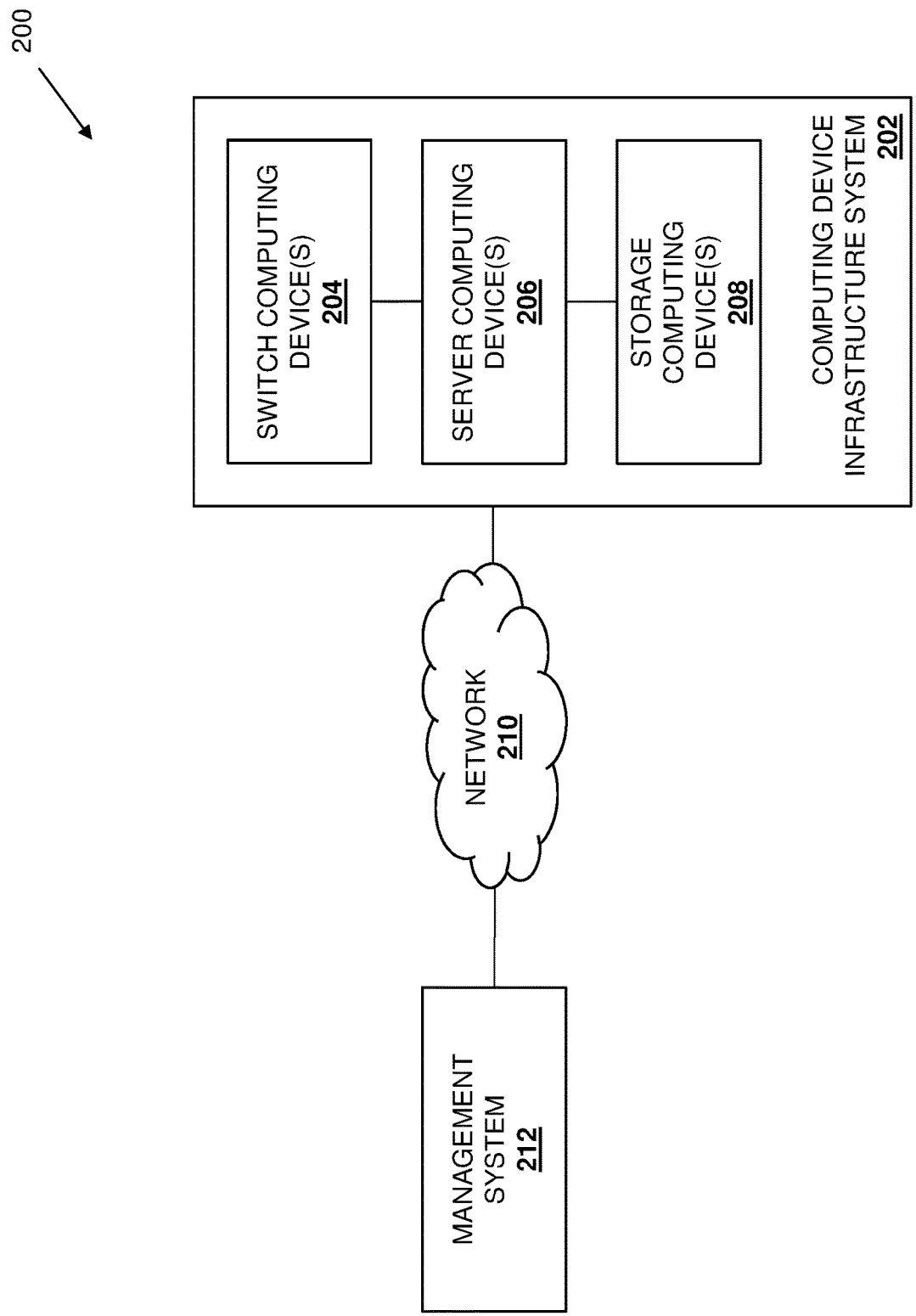
FIG. 2 is a schematic view illustrating an embodiment of a computing device infrastructure trust domain system.

Referring now to FIG. 2, an embodiment of a computing device infrastructure trust domain system 200 is illustrated. In the illustrated embodiment, the computing device infrastructure trust domain system 200 includes a computing device infrastructure system 202 having one or more switch computing devices 204, one or more server computing devices 206, and one or more storage computing devices 208. In specific examples, each of switch computing device(s) 204, server computing device(s) 206, and storage computing device(s) 208 in the computing device infrastructure system 202 are coupled together and configured to operate to provide hyper-converged infrastructure functionality that virtualizes the elements of conventional hardware-defined systems via the provisioning of virtualized computing functionality (e.g., via a hypervisor or other virtualized computing component), virtualized/software-defined networking, and/or software-defined storage. In an embodiment, any or all of the switch computing devices 204, server computing devices 206, and/or storage computing devices 208 may be provided by the IHS 100 discussed above with reference to FIG. 1, and/or may include some or all of the components of the IHS 100.

In a specific example, the switch computing device(s) 204 may be provided by Top Of Rack (TOR) switch device(s) in a rack, with the server computing device(s) 206 and the storage computing device(s) 208 provided by server device(s) and storage device(s) that are included in that rack and coupled to the TOR switch device(s). However, while illustrated and discussed as being provided by TOR switch device(s), server device(s), and storage device(s), one of skill in the art in possession of the present disclosure will recognize that computing devices provided in the computing device infrastructure trust domain system 200 may include any devices that may be configured to operate similarly as discussed below. As such, in some embodiments, any of the switch computing device(s) 204, server computing device(s) 206, and/or storage computing device(s) 208 may be omitted from the computing device infrastructure system 202 while remaining within the scope of the present disclosure as well.

In the illustrated embodiment, the computing device infrastructure system 202 is coupled to a network 210 that may be provided by a Local Area Network (LAN), the Internet, combinations thereof, and/or any other network that would be apparent to one of skill in the art in possession of the present disclosure. Furthermore, the illustrated embodiment includes a management system 212 that is also coupled to the network 210. In an embodiment, the management system 212 may be provided by the IHS 100 discussed above with reference to FIG. 1, and/or may include some or all of the components of the IHS 100, and in the specific examples discussed below may be provided by one or more server devices that are configured to perform the management system functionality described below.

In an embodiment, the computing devices 204, 206, and 208 (e.g., management controller devices provided in those computing devices as discussed below) may be configured to "trust" the management system 212 via a variety of security/trust techniques that would be apparent to one of skill in the art in possession of the present disclosure. However, while illustrated and discussed as being provided by server device(s), one of skill in the art in possession of the present disclosure will recognize that management systems provided in the computing device infrastructure trust domain system 200 may include any devices that may be configured to operate similarly as the management system 212 discussed below. Thus, while a specific a computing device infrastructure trust domain system 200 has been illustrated and described, one of skill in the art in possession of the present disclosure will recognize that the computing device infrastructure trust domain system of the present disclosure may include a variety of components and component configurations while remaining within the scope of the present disclosure as well.

Figure 3:
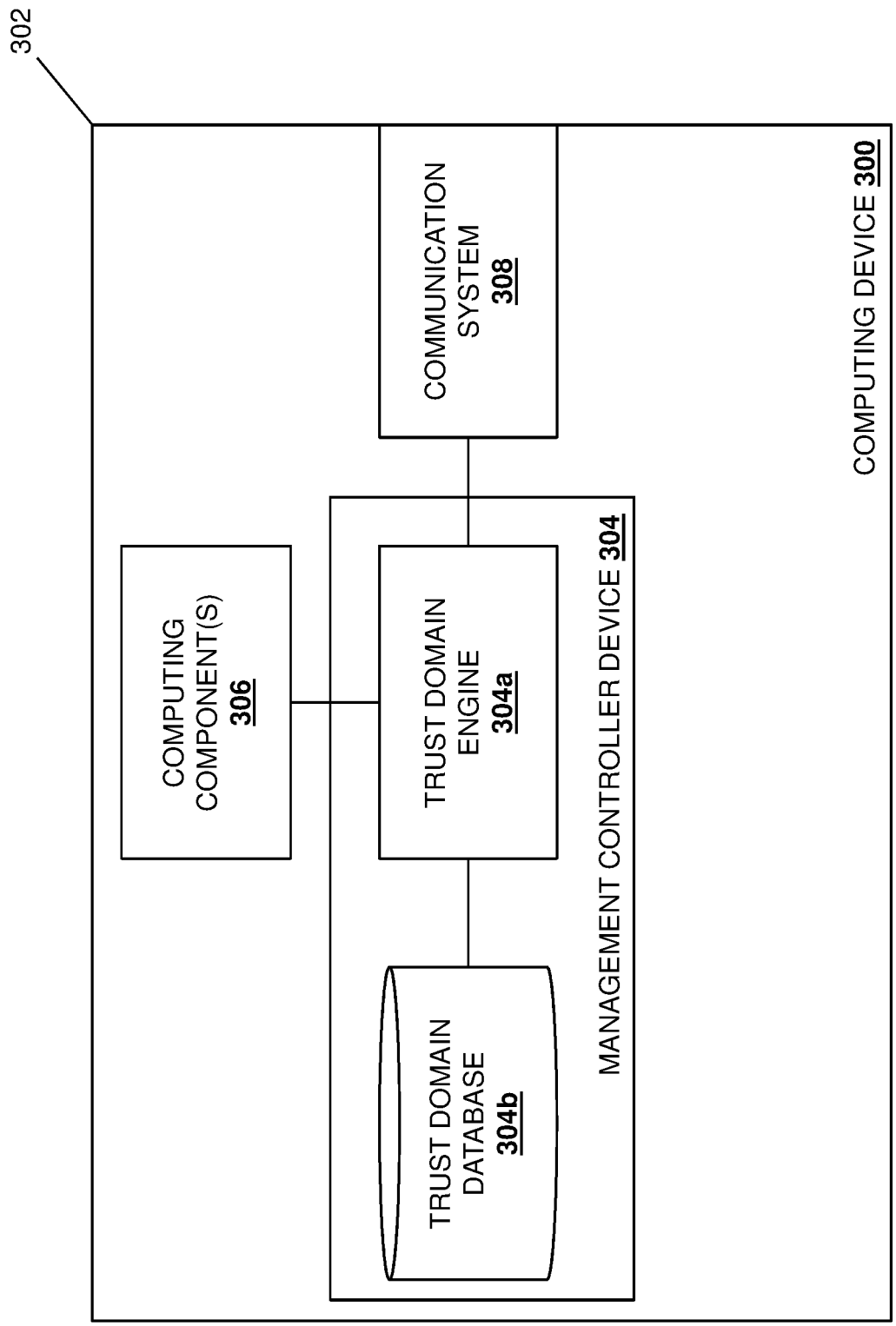
FIG. 3 is a schematic view illustrating an embodiment of a computing device that may be included in the computing device infrastructure trust domain system of FIG. 2.

Referring now to FIG. 3, an embodiment of a computing device 300 is illustrated that may provide any or all of the switch computing device(s) 204, the server computing device(s) 206, and/or the storage computing device(s) 208 in the computing device infrastructure system 202 discussed above with reference to FIG. 2. As such, the computing device 300 may be provided by the IHS 100 discussed above with reference to FIG. 1 and/or may include some or all of the components of the IHS 100, and in specific examples may be provided by TOR switch device(s), server device(s), and/or storage device(s). Furthermore, while illustrated and discussed as being provided by TOR switch device(s), server device(s), and/or storage device(s), one of skill in the art in possession of the present disclosure will recognize that the functionality of the computing device 300 discussed below may be provided by other devices that are configured to operate similarly as the computing device 300 discussed below. In the illustrated embodiment, the computing device 300 includes a chassis 302 that houses the components of the computing device 300, only some of which are illustrated below. For example, the chassis 302 may house a management controller device 304 that may be provided by an integrated DELL® Remote Access Controller (iDRAC) device available in server devices provided by DELL® Inc. of Round Rock, Tex., United States, a Baseboard Management Controller (BMC) device, and/or other management controller devices that would be apparent to one of skill in the art in possession of the present disclosure.

In an embodiment, the management controller device 304 may include a processing system (not illustrated, but which may include the processor 102 discussed above with reference to FIG. 1) and a memory system (not illustrated, but which may include the memory 114 discussed above with reference to FIG. 1) that is coupled to the processing system and that includes instructions that, when executed by the processing system, cause the processing system to provide a trust domain engine 304s that is configured to perform the functionality of the trust domain engines and/or management controller devices discussed below. The management controller device 304 may also include a storage system (not illustrated, but which may include the storage 108 discussed above with reference to FIG. 1) that is coupled to the trust domain engine 304 (e.g., via a coupling between the storage system and the processing system) and that includes a trust domain database 304b that is configured to store any of the information utilized by the trust domain engine 304a discussed below. As will be appreciated by one of skill in the art in possession of the present disclosure, the management controller device 304 may be configured to allow the trust domain engine 304a to securely generate any of the secure data and/or information discussed below, and securely store that data and/or other information in the trust domain database 304b in a manner that prevents unauthorized access to that data and/or other information.

The chassis 302 may also house one or more computing components 306 that are accessible by the trust domain engine 304a. For example, the computing component(s) 306 may include hardware components in the computing device 300, software components in the computing device 300, and/or other components that, as discussed below, may be associated with component information that may be utilized by the trust domain engine 304a in order to enable the trust domain discussed below. The chassis 302 may also house a communication system 308 that is coupled to the trust domain engine 304a (e.g., via a coupling between the communication system 308 and the processing system) and that may be provided by a Network Interface Controller (NIC), wireless communication systems (e.g., BLUETOOTH®, Near Field Communication (NFC) components, WiFi components, etc.), and/or any other communication components that would be apparent to one of skill in the art in possession of the present disclosure. However, while a specific computing device 300 has been illustrated, one of skill in the art in possession of the present disclosure will recognize that computing devices (or other devices operating according to the teachings of the present disclosure in a manner similar to that described below for the computing device 300) may include a variety of components and/or component configurations for providing conventional computing device functionality, as well as the functionality discussed below, while remaining within the scope of the present disclosure as well.

Figure 4:
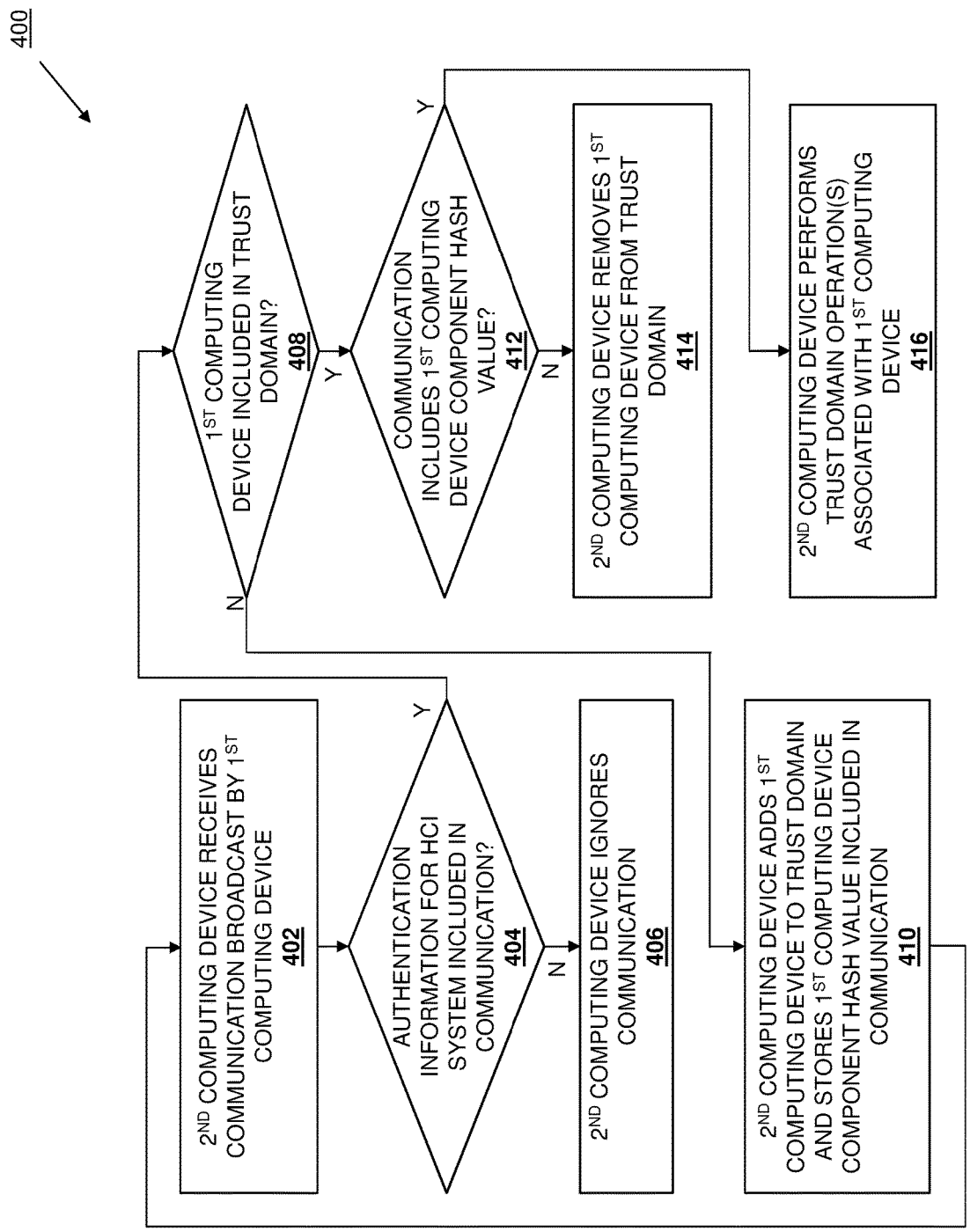
FIG. 4 is a flow chart illustrating an embodiment of a method for providing a trust domain for computing device infrastructure system.

Referring now to FIG. 4, an embodiment of a method 400 for providing a trust domain for computing device infrastructure system is illustrated. As discussed below, the systems and methods of the present disclosure enable secure communications and privileged operations between computing devices that provide a computing device infrastructure system without the need for credentials or certificates and via the establishment of a trust domain between the computing devices that provide the computing device infrastructure system. For example, the computing device infrastructure trust domain system of the present disclosure may include first and second computing devices that are configured to operate as part of a computing device infrastructure system, with the second computing device storing authentication information that is specific to the computing device infrastructure system. The second computing device may receive a first communication broadcast by the first computing device, verify that the first communication includes the authentication information that is specific to the computing device infrastructure system and, in response, add the first computing device to a trust domain, and store a first computing device component hash value that is included in the first communication in the second computing device.

Subsequent to the first communication, the second computing device may receive a second communication from the first computing device, and determine whether the second communication includes the first computing device component hash value. If the second computing device determines that the second communication does not include the first computing device component hash value, the second computing device removes the first computing device from the trust domain. If the second computing device determines that the second communication includes the first computing device component hash value, the second computing device performs at least one trust domain operation associated with the first computing device. Thus, credential/certificate-based authentication required by computing devices in conventional computing device infrastructure systems is eliminated, eliminating the challenges associated with randomly-set credentials and/or the inability to pre-install certificates, and allowing the secure deployment/management of the computing device infrastructure system via external consoles and/or custom scripts that leverage the computing device infrastructure trust domain discussed above.

As described herein, the computing device infrastructure trust domain system 200 may operate to establish a trust domain between the switch computing device(s) 204, the server computing device(s), and the storage computing device(s) 208 that provide the computing device infrastructure system 202, which allows the switch computing device(s) 204, the server computing device(s), and the storage computing device(s) 208 to trust each other with inquiry requests, command execution requests, and/or other operations (e.g., management operations) that would be apparent to one of skill in the art in possession of the present disclosure. In an embodiment, the trust domain for the computing device infrastructure system 202 may be provisioned during an initial onboarding process that allows runtime operations for the computing device infrastructure system 202, which one of skill in the art in possession of the present disclosure will recognize may be provided by physically connecting the switch computing device(s) 204, the server computing device(s), and the storage computing device(s) 208 to each other as required to provide the computing device infrastructure system 202, and powering on or otherwise initializing the switch computing device(s) 204, the server computing device(s), and the storage computing device(s) 208.

In an embodiment, the trust domain information used to establish the trust domain for the computing device infrastructure system 202 may be provided on the switch computing device(s) 204, the server computing device(s), and the storage computing device(s) 208 during the manufacture of those computing devices (e.g., "at the factory") and prior to their provisioning to a customer, using a deployment service subsequent to the provisioning of the computing devices to a customer, and/or at any other time that would be apparent to one of skill in the art in possession of the present disclosure. For example, the trust domain information discussed above may be included in an "identity module" that is generated for, and provided on, each switch computing device(s) 204, the server computing device(s), and the storage computing device(s) 208 that provides the computing device infrastructure system 202.

In a specific example, the identity module for each computing device that provides the computing device infrastructure system 202 may be generated dynamically for that computing device, and may include authentication information that is specific to the computing device infrastructure system 202 such as, for example, a passphrase that is generated based on an order identifier for the computing device infrastructure system 202 (e.g., an order identifier generated by the computing device infrastructure system provider for the computing device infrastructure system 202 ordered by the customer). For example, the passphrase discussed above may be generated using any hashing algorithm that one of skill in the art in possession of the present disclosure would recognize as preventing the passphrase from being tampered with or reverse-engineered, and one of skill in the art in possession of the present disclosure will recognize that any of a variety of passphrase generation techniques may be utilized with the order identifier for the computing device infrastructure system 202 in order to generate the passphrase that provides the authentication information that is specific to the computing device infrastructure system 202, while remaining within the scope of the present disclosure. However, while the authentication information that is specific to the computing device infrastructure system 202 is described as a passphrase generated using an order identifier for the computing device infrastructure system 202, one of skill in the art in possession of the present disclosure will appreciate that a variety of other authentication information will fall within the scope of the present disclosure as well. In an embodiment, the authentication information (e.g., the passphrase discussed above) may be stored in the trust domain database 304b in each of the computing devices that provide the computing device infrastructure system 202.

As such, each of the switch computing device(s) 204, the server computing device(s), and the storage computing device(s) 208 that provides the computing device infrastructure system 202 may be provided with an identity module that includes the same authentication information that is specific to that computing device infrastructure 202 (e.g., the passphrase generated from the order identifier for that computing device infrastructure system 202). Furthermore, in some embodiments, the identity module for each computing device that provides the computing device infrastructure system 202 may also allow for the generation of a computing device component hash value that is specific to that computing device. For example, the computing device component hash value for each computing device may be generated by the trust domain engine 304a provided by the management controller device 304 in that computing device 300 using a hashing algorithm (e.g., Secure Hash Algorithm (SHA)-256 or other hashing algorithms known in the art) on component information associated with components in that computing device 300. As such, the trust domain engine 304a in the management controller device 304 may be configured to access the component information that is utilized to generate the computing device component hash value for the computing device 300 via the computing component(s) 306, the trust domain database 304b, and/or via any other component information source that would be apparent to one of skill in the art in possession of the present disclosure.

In a specific example, a computing device component hash value for any computing device in the computing device infrastructure system 202 may be generated using a hashing algorithm on a service tag for that computing device; a Media Access Control (MAC) address utilized by a management controller device in that computing device; serial numbers for processing device(s), memory device(s), storage device(s), communication device(s), and/or other hardware components in that computing device, and/or any other component information that would be apparent to one of skill in the art in possession of the present disclosure. As discussed below, the computing device component hash values may be utilized to determine whether any components in the computing device have been tampered with, and thus one of skill in the art in possession of the present disclosure will appreciate how the computing device component hash value may be generated using component information associated with any component in the computing device for which tamper-monitoring is desired.

As discussed in further detail below, during the method 400 and upon the initialization of the computing device infrastructure system 202, the trust domain engine 304a provided by the management controller device 304 in each of the switch computing device(s) 204, the server computing device(s), and the storage computing device(s) 208 that provide the computing device infrastructure system 202 may operate to retrieve its stored authentication information, generate its computing device component hash value, and broadcast the authentication information and computing device component hash value to the other computing devices that provide that computing device infrastructure system 202. For example, the trust domain engine 304a in each of the switch computing device(s) 204, the server computing device(s), and the storage computing device(s) 208 that provide the computing device infrastructure system 202 may encrypt the authentication information (e.g., the passphrase discussed above) and its generated computing device component hash value, and broadcast the encrypted authentication information and computing device component hash value such that the encrypted authentication information and computing device component hash value are accessible to the other computing devices that provide the computing device infrastructure system 202.

As such, each of the switch computing device(s) 204, the server computing device(s), and the storage computing device(s) 208 that provide the computing device infrastructure system 202 may receive the authentication information and computing device component hash value broadcast by the other computing devices that provide the computing device infrastructure system 202. For example, each of the switch computing device(s) 204, the server computing device(s), and the storage computing device(s) 208 that provide the computing device infrastructure system 202 may receive the encrypted authentication information (e.g., passphrase discussed above) and the encrypted computing device component hash value broadcast by the other computing devices that provide the computing device infrastructure system 202, and decrypt the encrypted authentication information and computing device component hash values.

In some examples, each of the switch computing device(s) 204, the server computing device(s), and the storage computing device(s) 208 that provide the computing device infrastructure system 202 may be configured to compare its computing device component hash value with computing device component hash values received from the other computing devices that provide the computing device infrastructure system 202, and utilize a computing device component hash value ranking system to determine if its computing device component hash value ranks "higher" than the computing device component hash values received from the other computing devices that provide the computing device infrastructure system 202. In some embodiments, the computing device in the computing device infrastructure system 202 that has the "highest ranked" computing device component hash value may then operate as a primary trust domain device, while the rest of the computing devices in the computing device infrastructure system 202 will operate as secondary trust domain devices, with the primary trust domain device operating to periodically ensure that other computing devices in the computing device infrastructure system 202 can still be trusted as discussed in further detail below.

Figure 5A:
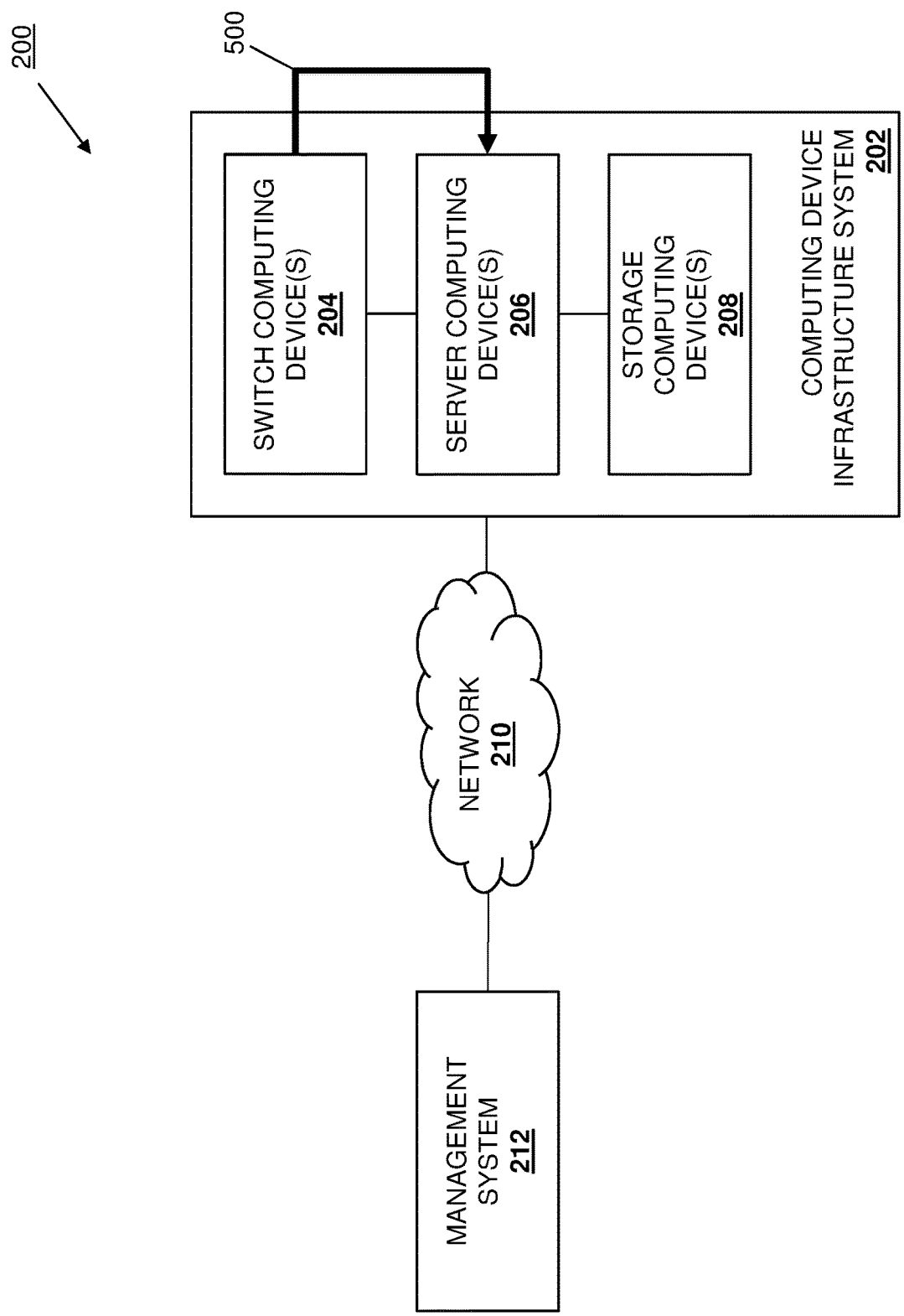
FIG. 5A is a schematic view illustrating an embodiment of the operation of the computing device infrastructure trust domain system of FIG. 2 during the method of FIG. 4.

The method 400 begins at block 402 where a second computing device receives a communication broadcast by a first computing device. With reference to FIG. 5A, in an embodiment of block 402 and following the initialization of the computing device infrastructure system 202, a switch computing device 204/300 may perform trust domain communication operations 500 that include broadcasting its stored authentication information and its switch computing device component hash value similarly as discussed above, and while only the switch computing device 204/300 is illustrated and described as performing trust domain communication operations 500 as part of the initialization of the computing device infrastructure system 202, one of skill in the art in possession of the present disclosure will appreciate from the discussion above that each of the switch computing device(s) 204, the server computing device(s), and the storage computing device(s) 208 that provide the computing device infrastructure system 202 may perform similar trust domain communication operations as part of the initialization of the computing device infrastructure system 202 as well.

Figure 5B:
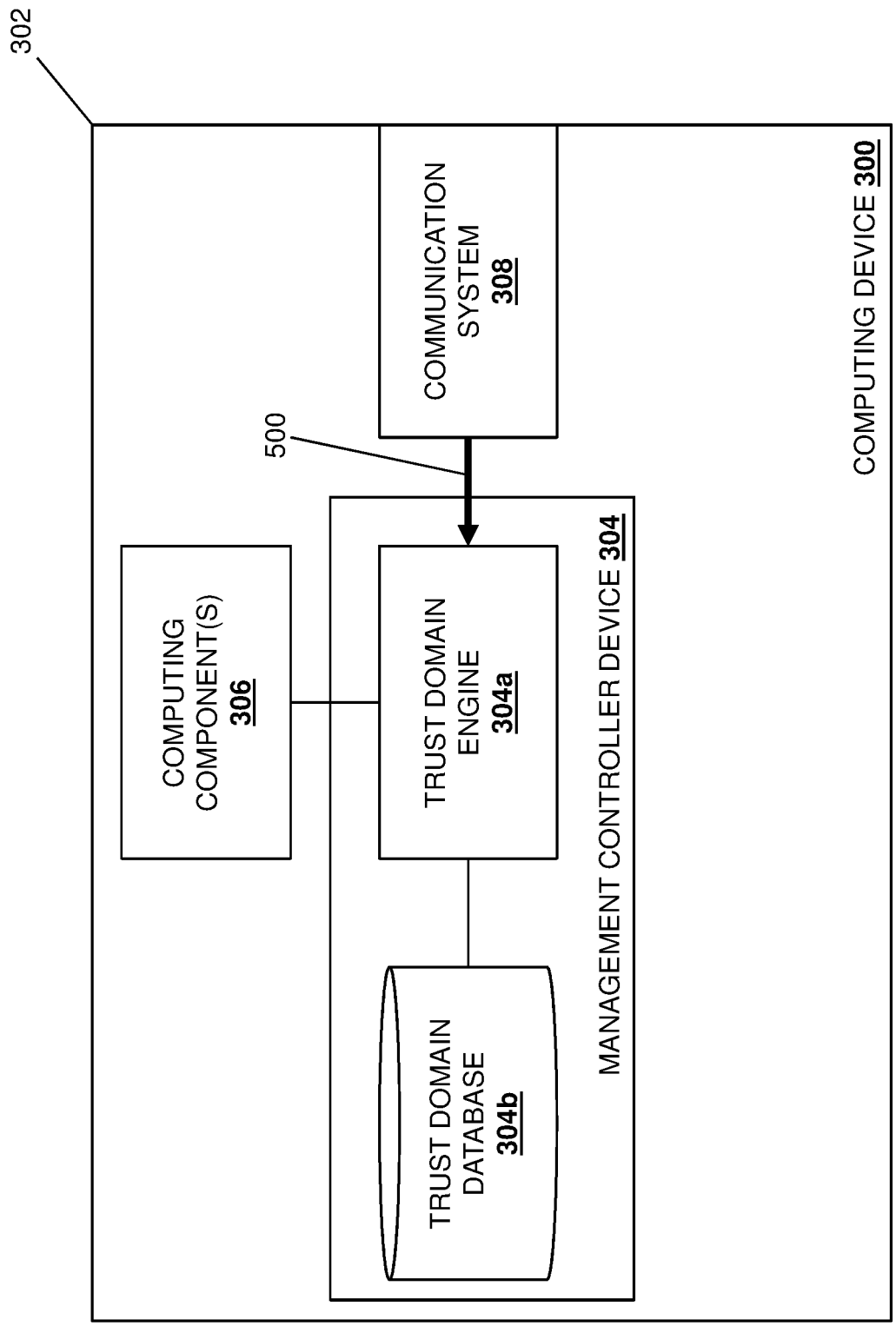
FIG. 5B is a schematic view illustrating an embodiment of the operation of the computing device of FIG. 3 during the method of FIG. 4.

With reference to FIG. 5B, at block 402 and as part of the trust domain communication operations 500, the trust domain engine 304a provided by the management controller device 304 in one of the server computing devices 206/300 may receive the authentication information and switch computing device component hash value broadcast by the switch computing device 204/300 via its communication system 308. Similarly as discussed above, while one of the server computing devices 206/300 is illustrated and described as receiving the authentication information and switch computing device component hash value from one of the switch computing device 204/300 during the trust domain communication operations 500 and as part of the initialization of the computing device infrastructure system 202, one of skill in the art in possession of the present disclosure will appreciate from the discussion above that each computing device 300 in the computing device infrastructure system 200 may receive authentication information and computing device component hash values from each of the other computing devices that provide the computing device infrastructure system 202 as well.

Figure 5C:
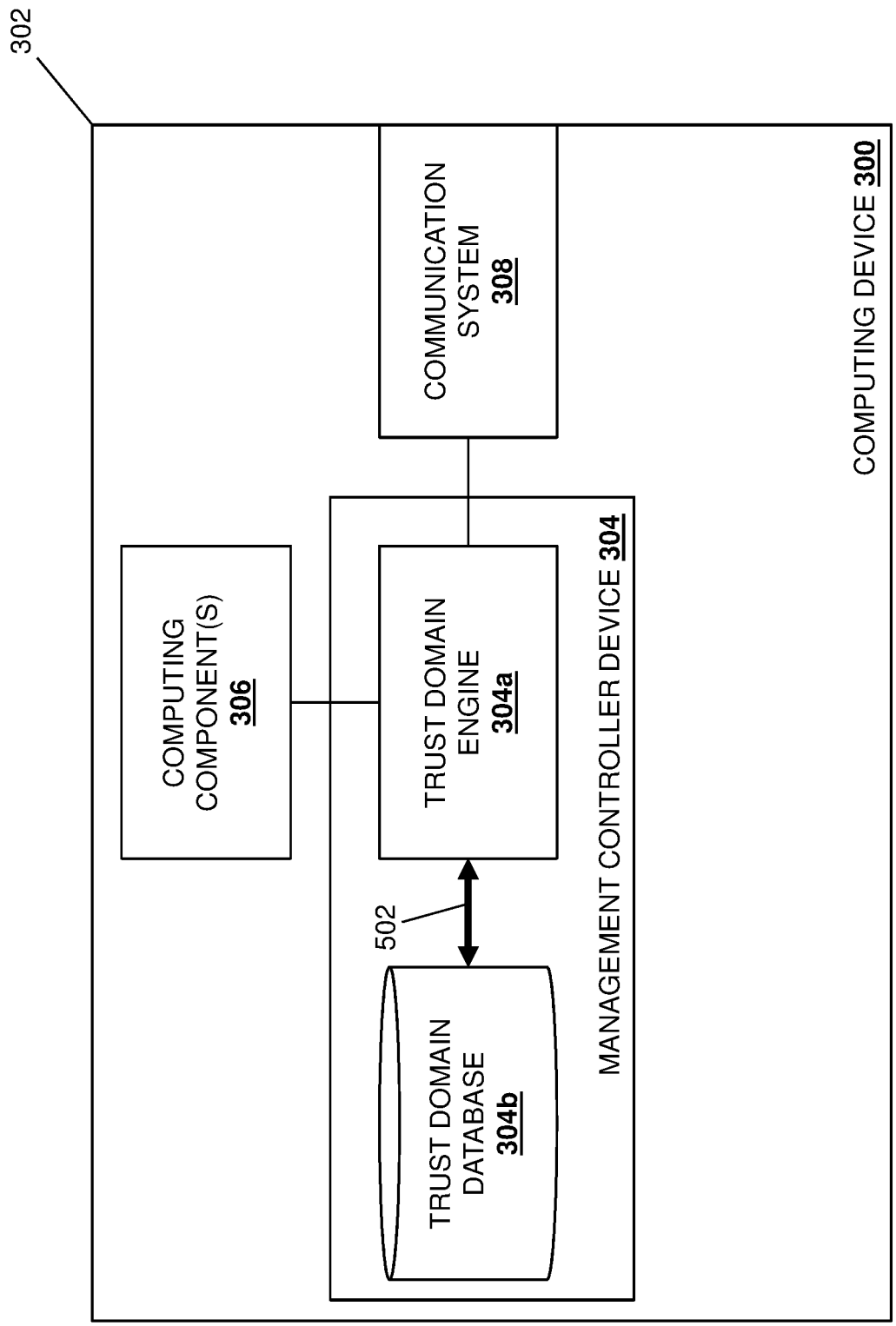
FIG. 5C is a schematic view illustrating an embodiment of the operation of the computing device of FIG. 3 during the method of FIG. 4.
Figure 5D:
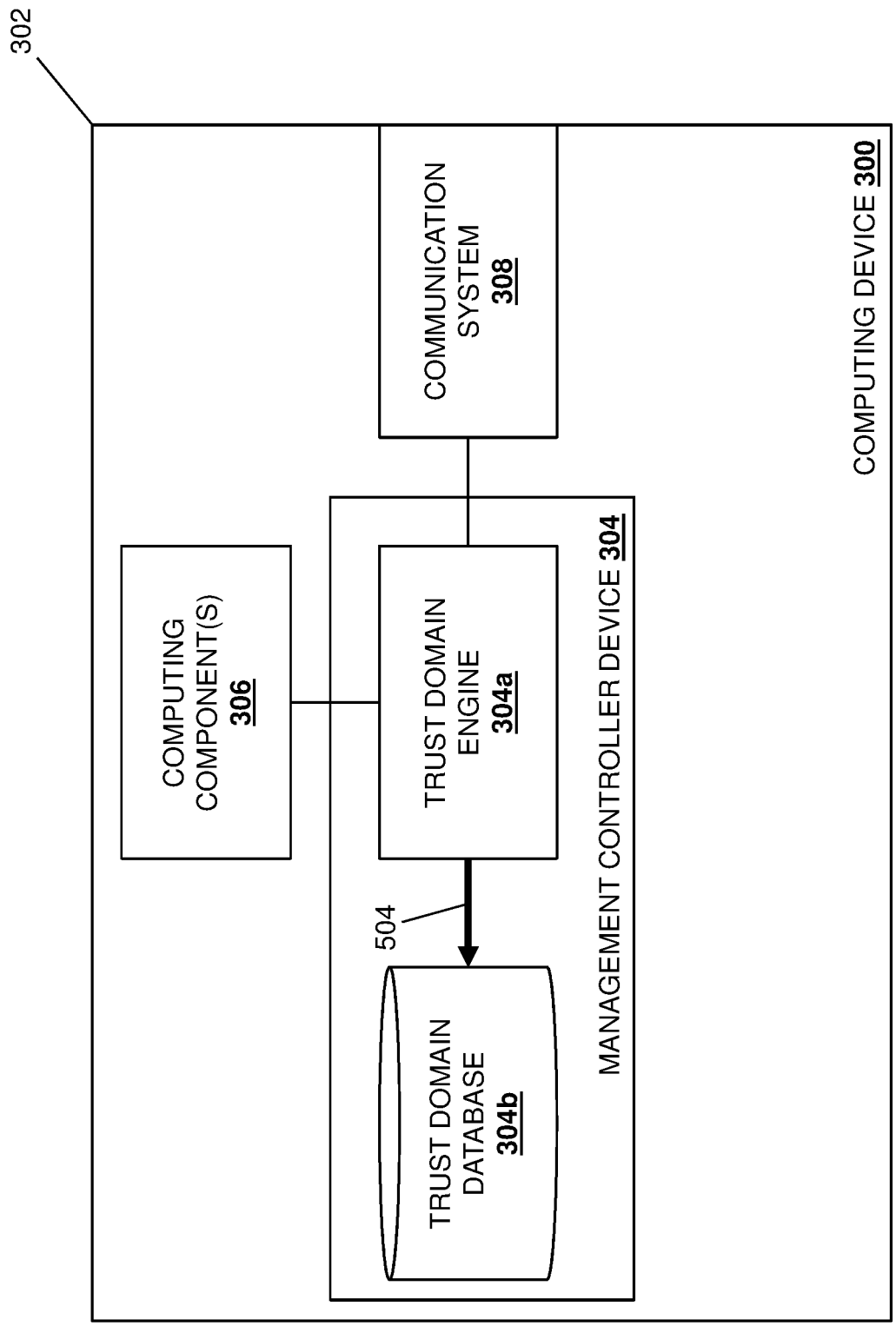
FIG. 5D is a schematic view illustrating an embodiment of the operation of the computing device of FIG. 3 during the method of FIG. 4.

The method 400 then proceeds to decision block 404 where it is determined whether authentication information for a computing device infrastructure system is included in the communication. With reference to FIG. 5C, in an embodiment of decision block 404, the trust domain engine 304a provided by the management controller device 304 in the server computing device 206/300 may perform authentication information validation operations 502 to determine whether the authentication information received from the switch computing device 204/300 matches the authentication information (e.g., the passphrase discussed above) stored in the trust domain database 304b.

For example, at decision block 404, the trust domain engine 304a provided by the management controller device 304 in the server computing device 206/300 may decrypt the encrypted authentication information (e.g., the passphrase discussed above) received from the switch computing device 204/300, compare the decrypted authentication information to the authentication information stored in the trust domain database 304b, and determine whether the authentication information received from the switch computing device 204/300 matches the authentication information stored in the trust domain database 304b. However, while a specific validation technique has been described, one of skill in the art in possession of the present disclosure will appreciate that authentication information may be validated in a variety of manners that will fall within the scope of the present disclosure as well. Similarly as discussed above, while one of the server computing devices 206/300 is illustrated and described as determining whether the authentication information received from one of the switch computing device 204/300 matches its stored authentication information, one of skill in the art in possession of the present disclosure will appreciate from the discussion above that each computing device 300 in the computing device infrastructure system 200 may determine whether the authentication information received from the other computing devices matches its stored authentication information as well.

If, at decision block 404, it is determined that the authentication information for the computing device infrastructure system is not included in the communication, the method 400 proceeds to block 406 where the second computing device ignores the communication. In an embodiment, at block 406 and in response to determining the authentication information received from the switch computing device 204/300 does not match the authentication information stored in the trust domain database 304b, the trust domain engine 304a provided by the management controller device 304 in the server computing device 206/300 may operate to ignore the broadcast communication received from the switch computing device 204/300. As such, following the initialization of the computing device infrastructure system 202, any computing device that broadcasts authentication information that does not match the authentication information stored in another computing device will be ignored by that computing device, which one of skill in the art in possession of the present disclosure will recognize helps to build the trust domain discussed below from only computing devices that are part of the same computing device infrastructure system (e.g., via the matching of the passphrase that is generated from the order identifier for that computing device infrastructure, or the matching of other authentication information that is specific to that computing device infrastructure).

If at decision block 404, it is determined that the authentication information for the computing device infrastructure system is included in the communication, the method 400 proceeds to decision block 408 depending on whether the first computing device is included in a trust domain. In an embodiment, at decision block 408 and in response to determining the authentication information received from the switch computing device 204/300 matches the authentication information stored in the trust domain database 304b, the method may proceed depending on whether the switch computing device 204/300 is included in a trust domain for the computing device infrastructure 202. As discussed above, this iteration of the method 400 follows an initialization of the computing device infrastructure 202 in order to build the trust domain for the computing device infrastructure system 202, and thus the switch computing device 204/300 is not yet included in the trust domain for the computing device infrastructure 202 and the method 400 proceeds from decision block 408 to block 410. However, as discussed in further detail below, in iterations of the method 400 that follow the addition of the switch computing device 204/300 to the trust domain for the computing device infrastructure 202, the method 400 will proceed from decision block 408 to decision block 412.

If, at decision block 408, the first computing device is not included in the trust domain, the method 400 proceeds to block 410 where the second computing device adds the first computing device to the trust domain and stores a first computing device component hash value that is included in the communication. In an embodiment, at block 410, the trust domain engine 304a provided by the management controller device 304 in the server computing device 206/300 may perform trust domain addition operations 504 that operate to add the switch computing device 204/300 to the trust domain for the computing device infrastructure 202 by, for example, storing the switch computing device hash value that was broadcast by the switch computing device 204/300 to the trust domain database 304b. For example, at block 410, the trust domain engine 304a provided by the management controller device 304 in the server computing device 206/300 may decrypt the encrypted switch computing device component hash value received from the switch computing device 204/300, and store the decrypted switch computing device component hash value in the trust domain database 304b.

As will be appreciated by one of skill in the art in possession of the present disclosure, the addition of the switch computing device 204/300 to the trust domain for the computing device infrastructure system 202 may be accomplished by storing the switch computing device component hash value in the trust domain database 304b, as well as via the performance of other trust domain addition operations (e.g., storing an identifier for the switch computing device 204/300 in the trust domain database 304b) as well. As such, following the initialization of the computing device infrastructure system 202, any computing device that broadcasts authentication information that matches the authentication information stored in another computing device will be added to the trust domain for the computing device infrastructure system 202 utilized by that computing device, and have its computing device component hash value stored in that computing device, which one of skill in the art in possession of the present disclosure will recognize helps to build the trust domain discussed below that includes only computing devices that are part of the same computing device infrastructure system (e.g., via the matching of the passphrase that is generated from the order identifier for that computing device infrastructure system, or matching of other authentication information that is specific to that computing device infrastructure system, etc.).

In an embodiment, subsequent to the building of the trust domain for the computing device infrastructure system 202, the computing device in the computing device infrastructure system 202 operating as the primary trust domain device discussed above may operate to perform trust domain device verification operations. For example, during the building of the trust domain, the trust domain engine 304a provided by the management controller device 304 in the server computing device 206/300 may determine that its server computing device component hash value is ranked "higher" than the computing device component hash values received from any of the other computing device that are included in the trust domain for the computing device infrastructure system 202 and, in response, may determine that it should operate as the primary trust domain device. Similarly, each of those other computing devices that are included in the trust domain for the computing device infrastructure system 202 may determine that their computing device component hash values are ranked "lower" than the server computing device component hash value received from the server computing device 206/300 and, in response, may determine that they should operate as secondary trust domain devices.

In response to determining that it should operate as the primary trust domain device, the trust domain engine 304a provided by the management controller device 304 in the server computing device 206/300 may perform trust domain device verification operations that may include, for example, the generation and transmission of periodic "heartbeat" messages to each of the computing devices that are included in the trust domain for the computing device infrastructure system 202. In an embodiment, "heartbeat" messages transmitted during the trust domain device verification operations 506 may include any instructions and/or information that are configured to cause computing devices operating as a secondary computing device and receiving that "heartbeat" message to generate and transmit its computing device component hash value back to the primary trust domain device.

As such, following block 410 and the building of the trust domain for the computing device infrastructure system 202, the method 400 may return to block 402 where the second computing device receives a communication broadcast by the first computing device. On iterations of the method 400 subsequent to the building of the trust domain, communications generated by the first computing device and received by the second computing device may include "heartbeat" response communications to the "heartbeat" messages discussed above, trust domain operation inquiry/request communications, and/or any other communication that would be apparent to one of skill in the art in possession of the present disclosure.

Figure 5E:
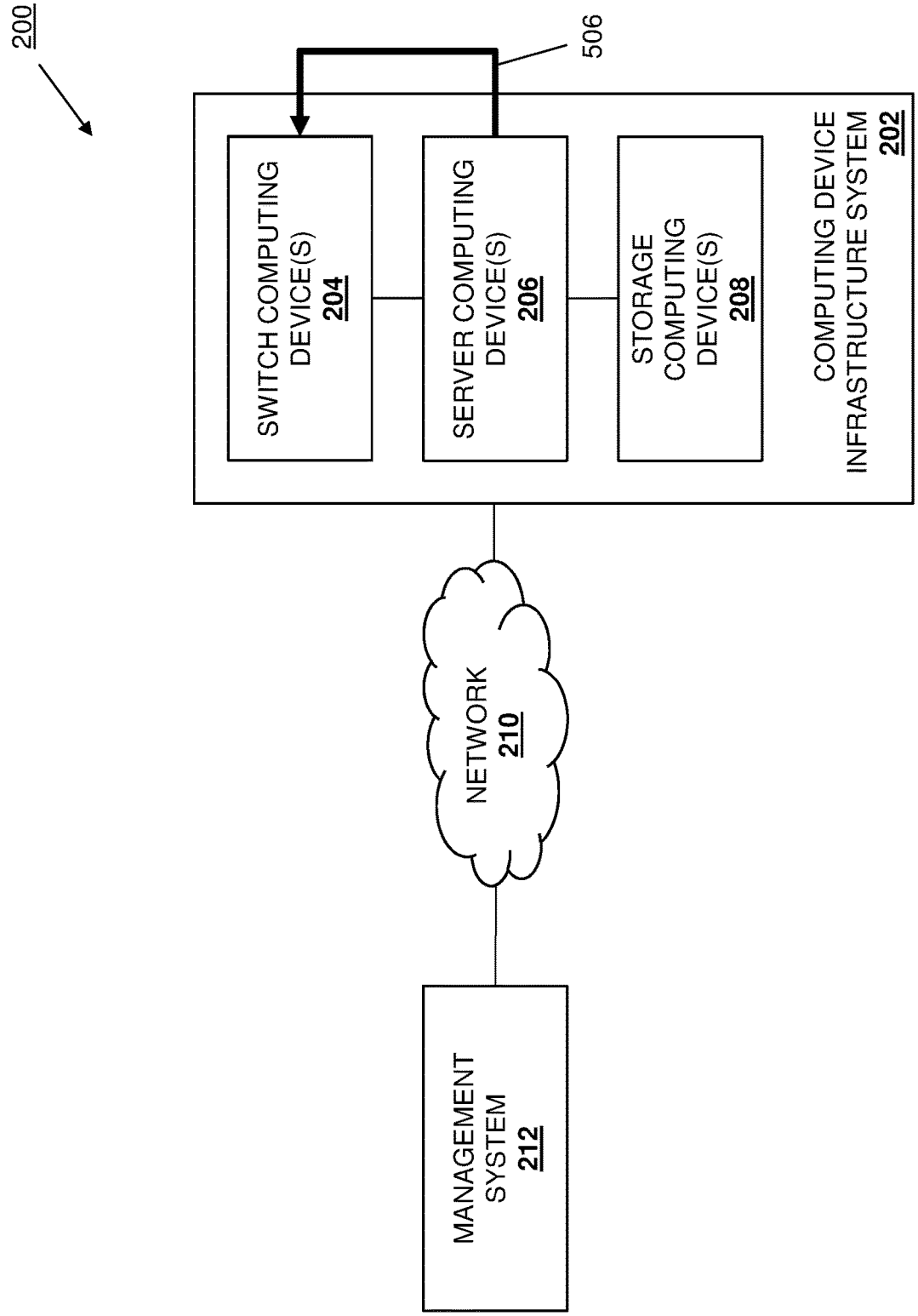
FIG. 5E is a schematic view illustrating an embodiment of the operation of the computing device infrastructure trust domain system of FIG. 2 during the method of FIG. 4.

Thus, with reference to the specific example of some embodiments of the subsequent iteration of the method 400 illustrated in FIG. 5E, the trust domain engine 304a provided by the management controller device 304 in the server computing device 206/300 may perform trust domain device verification operations 506 that include generating and transmitting a unicast "heartbeat" message to the switch computing device 204/300, and one of skill in the art in possession of the present disclosure will recognize that the trust domain engine 304a provided by the management controller device 304 in the server computing device 206/300 may perform trust domain device verification operations 506 that include generating and transmitting unicast "heartbeat" messages to any other computing device (e.g., operating as a secondary computing device as discussed above) in the trust domain for the computing device infrastructure system 202 as well.

As such, on this subsequent iteration of the method 400, the trust domain engine 304a provided by the management controller device 304 in the switch computing device 204/300 may receive the "heartbeat" message from the server computing device 206/400 (e.g., via its communication system 308). In response, and with reference back to FIG. 5A, at block 402 the trust domain engine 304a provided by the management controller device 304 in the switch computing device 204/300 may perform the trust domain communication operations 500 discussed above that may include retrieving the authentication information (e.g., the passphrase discussed above) from its trust domain database 304b, generating its switch computing device component hash value (e.g., using the hashing algorithm and component information retrieved from its computing component(s) 306 and/or trust domain database 304b), encrypting the authentication information and switch computing device component hash value, and transmitting the encrypted authentication information and switch computing device component hash value to the server computing device 206/300. Thus, with reference back to FIG. 5B, the trust domain engine 304a provided by the management controller device 304 in the server computing device 206/300 may receive the encrypted authentication information and switch computing device component hash value from the switch computing device 204/300 (e.g., via its communication system 308) as part of the trust domain communication operations 500.

The subsequent iteration of the method 400 may then proceed to block 404 where the trust domain engine 304a provided by the management controller device 304 in the server computing device 206/300 determines whether the authentication information for the computing device infrastructure system 202 is included in the communication received from the switch computing device 204/300 similarly as discussed above. In this example, the authentication information for the computing device infrastructure system 202 is included in the communication received from the switch computing device 204/300, and the subsequent iteration of the method 400 proceeds to decision block 408 where the method 400 proceeds depending on whether the switch computing device 204/300 is included in the trust domain for the computing device infrastructure system 202 similarly as discussed above. In this example, the switch computing device 204/300 is included in the trust domain for the computing device infrastructure system 202, as it was added to that trust domain on the previous iteration of the method 400.

Figure 5F:
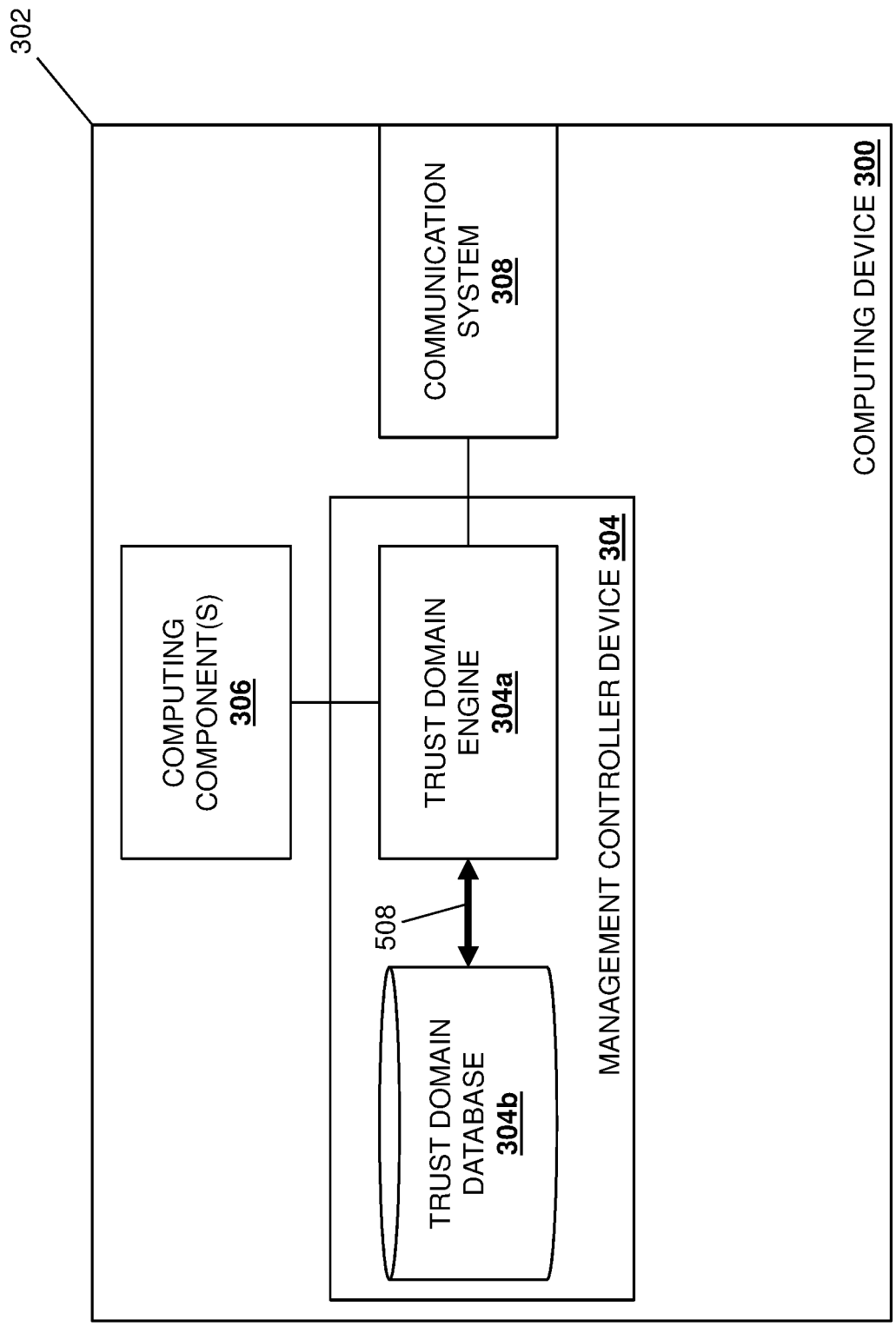
FIG. 5F is a schematic view illustrating an embodiment of the operation of the computing device infrastructure trust domain system of FIG. 2 during the method of FIG. 4.

Thus, at decision block 408 on this subsequent iteration of the method 400 after the building of the trust domain for the computing device infrastructure system 202, the method 400 proceeds to decision block 412 where it is determined whether communication includes the first computing device component hash value. With reference to FIG. 5F, in an embodiment of decision block 412, the trust domain engine 304a provided by the management controller device 304 in the server computing device 206/300 may perform computing device component hash value validation operations 508 to determine whether the switch computing device component hash value received from the switch computing device 204/300 matches the switch computing device component hash value for the switch computing device 204/300 that was stored in the trust domain database 304b on the previous iteration of the method 400.

For example, at decision block 412, the trust domain engine 304a provided by the management controller device 304 in the server computing device 206/300 may decrypt the encrypted switch computing device component hash value received from the switch computing device 204/300, compare the decrypted switch computing device component hash value to the switch computing device component hash value for the switch computing device 204/300 that was stored in the trust domain database 304b on the previous iteration of the method 400, and determine whether the decrypted switch computing device component hash value received from the switch computing device 204/300 matches the switch computing device component hash value for the switch computing device 204/300 that was stored in the trust domain database 304b on the previous iteration of the method 400. However, while a specific validation technique has been described, one of skill in the art in possession of the present disclosure will appreciate that computing device component hash values may be validated in a variety of manners that will fall within the scope of the present disclosure as well. Similarly as discussed above, while one of the server computing device 206/300 is illustrated and described as determining whether the switch computing device component hash value received from one of the switch computing device 204/300 matches its stored switch computing device component hash values, one of skill in the art in possession of the present disclosure will appreciate from the discussion above that any computing device 300 in the computing device infrastructure system 200 may determine whether the computing device component hash values received from the other computing devices matches its stored computing device component hash values as well.

If, at decision block 412, it is determined that the communication does not include the first computing device component hash value, the method 400 proceeds to block 414 where the second computing device removes the first computing device from the trust domain. As will be appreciated by one of skill in the art in possession of the present disclosure, in some embodiments, the computing device component hash value received in a communication from a computing device may not match the computing device component hash value that was stored for that computing device during the pervious iteration of the method 400. For example, any change in a computing component 306 and/or the component information in a computing device 300 that was used to generate the computing device component hash value during a first iteration of the method 400 will result in a change in the computing device component hash value generated for that computing device during a subsequent iteration of the method 400.

As such, a change associated with the service tag for the computing device 300 (e.g., via the replacement of the motherboard in the computing device 300), a change associated with the MAC address used by the management controller device in the computing device 300 (e.g., via a replacement of the management controller device), a change associated with hardware components (e.g., replacement of processing device(s), memory device(s), storage device(s), communication device(s), etc.), and/or other component/component information changes that would be apparent to one of skill in the art in possession of the present disclosure, will result in the generation of a computing device component hash value that is different than the computing device component hash value that was stored for that computing device 300 during the previous iteration of the method 400.

Thus, in the event the trust domain engine 304a provided by the management controller device 304 in the server computing device 206/300 determines that the switch computing device component hash value received from the switch computing device 204/300 does not match the switch computing device component hash value that was stored for that switch computing device 204/300 during the previous iteration of the method 400, the trust domain engine 304a provided by the management controller device 304 in the server computing device 206/300 may operate to remove the switch computing device 204/300 from the trust domain for the computing device infrastructure system 202 by, for example, removing the switch computing device component hash value for the switch computing device 204/300 that is stored in its trust domain database 304b, and/or performing any other trust domain removal operations that would be apparent to one of skill in the art in possession of the present disclosure. Furthermore, for communications received from the switch computing device 204/300 that include an inquiry or request, the trust domain engine 304a provided by the management controller device 304 in the server computing device 206/300 may transmit a notification to the switch computing device 204/300 that its access to computing devices in the trust domain for the computing device infrastructure system 202 is denied.

Furthermore, in embodiments in which the "heartbeat" messages are transmitted during the trust domain device verification operations 506 by the primary trust domain device as discussed above, the trust domain engine 304a provided by the management controller device 304 in the server computing device 206/300 may be configured to wait a time period and, if no response is received from the switch computing device 204/300 during that time period, the method 400 may immediately proceed to block 414 where the trust domain engine 304a provided by the management controller device 304 in the server computing device 206/300 may operate to remove the switch computing device 204/300 from the trust domain for the computing device infrastructure system 202 similarly as described above.

Thus, if a first computing device that is in the trust domain for the computing device infrastructure system 202 transmits a communication to a second computing device that is in the trust domain for the computing device infrastructure system 202, and that communication includes a computing device component hash value that does not match the computing device component hash value that the second computing device has stored for the first computing device, the second computing device will remove the first computing device from the trust domain for the computing device infrastructure system 202 used by the second computing device. Furthermore, if a first computing device that is in the trust domain for the computing device infrastructure system 202 and that is operating as a secondary trust domain device does not respond to a "heartbeat" message from a second computing device that is in the trust domain for the computing device infrastructure system 202 and that is operating as a primary trust domain device, the second computing device will remove the first computing device from the trust domain for the computing device infrastructure system 202 used by the second computing device. Further still, any second computing device that is in the trust domain for the computing device infrastructure system 202 and that removes a first computing device from the trust domain for the computing device infrastructure system 202 may transmit communications to third computing devices that are in the trust domain for the computing device infrastructure system 202 in order to allow those third computing devices to remove the first computing device from the trust domain for the computing device infrastructure system 202 as well.

If at decision block 412, it is determined that the communication includes the first computing device component hash value, the method 400 proceeds to block 416 where the second computing device performs trust domain operation(s) associated with the first computing device. As will be appreciated by one of skill in the art in possession of the present disclosure, in many embodiments, the computing device component hash value received in a communication from a computing device will match the computing device component hash value that was stored for that computing device during the previous iteration of the method 400. For example, when no change occurs in a computing component 306 and/or the component information in a computing device 300 that was used to generate the computing device component hash value during a first iteration of the method 400, the computing device component hash value generated for that computing device during a subsequent iteration of the method 400 will match that computing device component hash value stored during the previous iteration of the method 400.

Thus, in the event the trust domain engine 304a provided by the management controller device 304 in the server computing device 206/300 determines that the switch computing device component hash value received from the switch computing device 204/300 matches the switch computing device component hash value that was stored for that switch computing device 204/300 during the previous iteration of the method 400, the trust domain engine 304a provided by the management controller device 304 in the server computing device 206/300 may perform one or more trust domain operations associated with the switch computing device 204/300. As will be appreciated by one of skill in the art in possession of the present disclosure, a variety of interactions may occur between the switch computing device(s) 204, the server computing device(s) 206, and/or the storage computing device(s) 208 that require the communications discussed above including, for example, communications involving inquiries or requests to access management interfaces as part of a workflow.

For example, when the communication received from the switch computing device 204/300 is an inquiry or command execution request, at block 416 the trust domain engine 304a provided by the management controller device 304 in the server computing device 206/300 may respond to that inquiry, execute the command associated with the command execution request, allow the inquiry or command execution request to proceed, and/or perform any other trust domain operations that would be apparent to one of skill in the art in possession of the present disclosure. Furthermore, for any inquiry or request that must be forwarded to another device or system (e.g., the management system 212), the trust domain engine 304a provided by the management controller device 304 in the server computing device 206/300 may provide an authorization header to any communication that is being forwarded to satisfy that inquiry or request in order to indicate that the inquiry or request has been validated as having been received from a computing device in the trust domain for the computing device infrastructure system 202.

Furthermore, in embodiments in which the "heartbeat" messages are transmitted during the trust domain device verification operations 506 by the primary trust domain device as discussed above, the trust domain engine 304a provided by the management controller device 304 in the server computing device 206/300 may receive a response from the switch computing device 204/300 that includes the switch computing device component hash value that matches the switch computing device component hash value that was stored for that switch computing device 2048/300 during the previous iteration of the method 400, and the method 400 may immediately proceed to block 416 where the trust domain engine 304a provided by the management controller device 304 in the server computing device 206/300 may operate to perform one or more trust domain operations associated with the switch computing device 204/300 that, in this embodiment, include allowing the switch computing device 204/300 to remain in the trust domain for the computing device infrastructure system 202.

Thus, if a first computing device that is in the trust domain for the computing device infrastructure system 202 transmits a communication to a second computing device that is in the trust domain for the computing device infrastructure system 202, and that communication includes a computing device component hash value that matches the computing device component hash value that the second computing device has stored for the first computing device, the second computing device may perform any of a variety of trust domain operations associated with the first computing device (including operations requested in the communication received from the first computing device). Furthermore, if a first computing device that is in the trust domain for the computing device infrastructure system 202 and that is operating as a secondary trust domain device responds to a "heartbeat" message from a second computing device that is in the trust domain for the computing device infrastructure system 202 and that is operating as a primary trust domain device, the first computing device will remain in the trust domain for the computing device infrastructure system 202 as long as that "heartbeat" message response includes a computing device component hash value that matches the computing device component hash value that the second computing device has stored for the first computing device.

In some embodiments, a customer may wish to change component(s) in one or more computing devices in the computing device infrastructure system 202. For example, a customer may change a Network Interface Controller (NIC) device in the switch computing device 204/300, which one of skill in the art in possession of the present disclosure will recognize will cause a resulting change in the switch computing device component hash value for the switch computing device 204/300 (which is presumably generated using an identifier for the NIC device), and cause that switch computing device 204/300 to be removed from the trust domain for the computing device infrastructure system 202. In some embodiments, the computing device infrastructure trust domain system may be configured, by design, to remove a computing device from the trust domain for the computing device infrastructure system 202 in the event a component in that computing device is changed.

In order to remedy the removal of computing devices from the trust domain for the computing device infrastructure system 202 after the authorized replacement or other change of a component in that computing device, the management system 212 may operate to generate an updated identity module for the switch computing device 204/300 that was provided the different NIC device, which one of skill in the art in possession of the present disclosure will recognize includes the authentication information for the existing trust domain, an updated switch computing device component hash value for the switch computing device 204/300, and a trust domain component add flag that can only be set by the management system 212 and that allows the updated switch computing device component hash to be added to the trust domain as discussed. As illustrated in FIG. 6, the management system 212 may then perform identity module update operations 600 that include transmitting the updated identity module via the network 210 to the switch computing device 204/300. As such, when the switch computing device 204/300 subsequently broadcasts its authentication information and switch computing device component hash value to the other computing devices in the computing device infrastructure system 202 similarly as discussed above, and due to the setting of the trust domain component add flag, those computing devices will add the switch computing device 204/300 back into the trust domain for the computing device infrastructure system 202 similarly as discussed above.

Thus, systems and methods have been described that provide a trust domain for an HCl system. As discussed below, the systems and methods of the present disclosure enable secure communications and privileged operations between computing devices that provide an HCl system without the need for credentials or certificates and via the establishment of a trust domain between the computing devices that provide the HCl system. For example, the HCl trust domain system of the present disclosure may include first and second computing devices that are configured to operate as part of an HCI system, with the second computing device storing a passphrase that is generated using an order identifier for the HCI system. The second computing device may then receive a first communication broadcast by the first computing device, verify that the first communication includes the passphrase and, in response, add the first computing device to a trust domain, and store a first computing device component hash value that is included in the first communication in the second computing device. Subsequent to the first communication, the second computing device may receive a second communication from the first computing device, and determine whether the second communication includes the first computing device component hash value. If not, the second computing device removes the first computing device from the trust domain. If so, the second computing device performs at least one trust domain operation associated with the first computing device.

Thus, credential/certificate-based authentication required by computing devices in conventional HCI systems is eliminated, eliminating the challenges associated with randomly-set credentials and/or the inability to pre-install certificates, and allowing the secure management of the HCI system via external consoles and/or custom scripts that leverage the HCI trust domain discussed above. The inventors of the present disclosure describe some use cases for the trust domain described herein in U.S. patent application Ser. No. 17/019,555, filed on Sep. 14, 2020 (directed to the automatic determination of a host operating system networking configuration for a computing device in a hyper-converged infrastructure system), U.S. patent application Ser. No. 17/019,630, filed on Sep. 14, 2020 (directed to the automatic configuration of networking for the operating system of a computing device in a hyper-converged infrastructure system), U.S. patent application Ser. No. 17/019,714, filed on Sep. 14, 2020 (directed to discovering server devices included in a hyper-converged infrastructure system), and U.S. patent application Ser. No. 17/019,790, filed on Sep. 14, 2020 (directed to cluster-aware networking fabric updates), the disclosure of which are incorporated by reference herein in their entirety.

Furthermore, while a single trust domain is described above, one of skill in the art in possession of the present disclosure will recognize that the switch computing device(s) 204 may provide a switch fabric that may be connected to multiple trust domains. For example, the switch device(s) 204 may operate according to the teachings of the present disclosure to be configured as part of a first trust domain that includes the server computing device(s) 206 and/or storage computing device(s) 208, as part of a second trust domain that includes other server computing device(s) and/or storage computing device(s), and/or part of additional trust domains as well. As such, the switch computing device(s) 204/switch fabric may track multiple trust domains to which they below via, for example, the trust domain database 304b that identifies different trust domains and their corresponding computing devices, and that allows the switch computing device(s) 204 to segregate the trust domains to which they belong. Further still, as will be appreciated by one of skill in the art in possession of the present disclosure, the trust domain for computing device infrastructure systems discussed above may be extended to computing devices that are external to that computing device infrastructure system while remaining within the scope of the present disclosure, which allows those external devices to participate in management tasks via the incorporation of identity modules and trust domain attributes discussed above in those external devices.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A computing device infrastructure trust domain system, comprising:
   a first computing device that is configured to operate as part of a computing device infrastructure system; and
   a second computing device that is configured to operate as part of the computing device infrastructure system, that stores authentication information that is specific to the computing device infrastructure system, and that is configured to:
      receive a first communication broadcast by the first computing device;
      verify that the first communication includes the authentication information that is specific to the computing device infrastructure system and, in response:
         add the first computing device to a trust domain; and
         store, in the second computing device, a first computing device component hash value that is included in the first communication;
      generate a second computing device component hash value using a respective second component identifier associated with at least one second component included in the second computing device;
      determine that the second computing device component hash value and the first computing device component hash value configure the second computing device to operate as a primary trust domain device and the first computing device to operate as a secondary trust domain device; and
      operate as the primary trust domain device to transmit a periodic request for the first computing device component hash value from the first computing device.

2. The system of claim 1, wherein the first computing device is configured to operate as part of the computing device infrastructure system, stores the authentication information that is specific to the computing device infrastructure system, and is configured, in response to initialization of the computing device infrastructure system, to:
   generate the first computing device component hash value using a respective first component identifier associated with at least one first component included in the first computing device; and
   broadcast the first communication including the authentication information and the first computing device component hash value.

3. The system of claim 1, wherein the second computing device is configured to generate the second computing device component hash value in response to initialization of the computing device infrastructure system and
   broadcast a second communication including the authentication information and the second computing device component hash value.

4. The system of claim 1, wherein the second computing device is configured to:
  receive, subsequent to the first communication, a second communication from the first computing device; and
  determine whether the second communication includes the first computing device component hash value and:
    remove, in response to determining that the second communication does not include the first computing device component hash value, the first computing device from the trust domain; and
    perform, in response to determining that the second communication includes the first computing device component hash value, at least one trust domain operation associated with the first computing device.

5. The system of claim 4, wherein the second computing device is configured to:
  receive, via a network from a management system, a first computing device component hash value change notification;
  receive, subsequent to the second communication, a third communication broadcast by the first computing device; and
  verify, in response to receiving the first computing device component hash value change notification, that the third communication includes the authentication information that is specific to the computing device infrastructure system and, in response:
    store, in the second computing device, an updated first computing device component hash value that is included in the third communication.

6. The system of claim 1, wherein the second computing device is configured to:
  remove, in response to receiving no response to the periodic request for a time period, the first computing device from the trust domain; and
  remove, in response to receiving a response to the periodic request that does not include the first computing device component hash value, the first computing device from the trust domain.

7. An Information Handling System (IHS), comprising:
  a processing system; and
  a memory system that is coupled to the processing system and that includes instructions that, when executed by the processing system, cause the processing system to provide a trust domain engine that is configured to:
    receive a first communication broadcast by a first computing device;
    verify that the first communication includes authentication information that is specific to a computing device infrastructure system and, in response:
      add the first computing device to a trust domain; and
      store a first computing device component hash value that is included in the first communication;
    generate a second computing device component hash value using a respective second component identifier associated with at least one second component included in the IHS;
    determine that the second computing device component hash value and the first computing device component hash value configure the trust domain engine to operate as a primary trust domain device and the first computing device to operate as a secondary trust domain device; and
    operate as the primary trust domain device to transmit a periodic request for the first computing device component hash value from the first computing device.

8. The IHS of claim 7, wherein the trust domain engine is configured to generate the second computing device component hash value in response to initialization of the computing device infrastructure system and
  broadcast a second communication including the authentication information and the second computing device component hash value.

9. The IHS of claim 8, wherein the respective second component identifier associated with at least one second component included in the IHS includes:
  a service tag associated with the IHS; and
  a Media Access Controller (MAC) address used by a management controller device in the IHS.

10. The IHS of claim 8, wherein the trust domain engine is configured to:
  receive, subsequent to the first communication, a second communication from the first computing device; and
  determine whether the second communication includes the first computing device component hash value and:
    remove, in response to determining that the second communication does not include the first computing device component hash value, the first computing device from the trust domain; and
    perform, in response to determining that the second communication includes the first computing device component hash value, at least one trust domain operation associated with the first computing device.

11. The IHS of claim 10, wherein the trust domain engine is configured to:
  receive, via a network from a management system, a first computing device component hash value change notification;
  receive, subsequent to the second communication, a third communication broadcast by the first computing device; and
  verify, in response to receiving the first computing device component hash value change notification, that the third communication includes the authentication information that is specific to the computing device infrastructure system and, in response:
    store, in the second computing device, an updated first computing device component hash value that is included in the third communication.

12. The IHS of claim 7, wherein the trust domain engine is configured to:
  remove, in response to receiving no response to the periodic request for a time period, the first computing device from the trust domain; and
  remove, in response to receiving a response to the periodic request that does not include the first computing device component hash value, the first computing device from the trust domain.

13. The IHS of claim 7, wherein authentication information is generated based on an order identifier for the computing device infrastructure system.

14. A method for providing a trust domain for computing device infrastructure system, comprising:
  receiving, by a second computing device, a first communication broadcast by a first computing device;
  verifying, by the second computing device, that the first communication includes authentication information that is specific to a computing device infrastructure system and, in response:
    adding, by the second computing device, the first computing device to a trust domain; and storing, by the second computing device, a first computing device component hash value that is included in the first communication;

generating, by the second computing device, a second computing device component hash value using a respective second component identifier associated with at least one second component included in the second computing device determining, by the second computing device, that the second computing device component hash value and the first computing device component hash value configure the second computing device to operate as a primary trust domain device and the first computing device to operate as a secondary trust domain device; and operating, by the second computing device, as the primary trust domain device to transmit a periodic request for the first computing device component hash value from the first computing device.

15. The method of claim 14, wherein the second computing device generates the second computing device component hash value in response to initialization of the computing device infrastructure system, and wherein the method further comprises:
broadcasting, by the second computing device in response to initialization of the computing device infrastructure system, a second communication including the authentication information and the second computing device component hash value.

16. The method of claim 15, wherein the respective second component identifier associated with at least one second component included in the second computing device includes:
a service tag associated with the first computing device; and
a Media Access Controller (MAC) address used by a management controller device in the first computing device.

17. The method of claim 15, further comprising:
receiving, by the second computing device subsequent to the first communication, a second communication from the first computing device; and
determining, by the second computing device, whether the second communication includes the first computing device component hash value and:
removing, by the second computing device in response to determining that the second communication does not include the first computing device component hash value, the first computing device from the trust domain; and
performing, by the second computing device in response to determining that the second communication includes the first computing device component hash value, at least one trust domain operation associated with the first computing device.

18. The method of claim 17, further comprising:
receiving, by the second computing device via a network from a management system, a first computing device component hash value change notification;
receiving, by the second computing device subsequent to the second communication, a third communication broadcast by the first computing device; and
verifying, by the second computing device in response to receiving the first computing device component hash value change notification, that the third communication includes the authentication information that is specific to the computing device infrastructure system and, in response:
storing, by the second computing device, an updated first computing device component hash value that is included in the third communication.

19. The method of claim 14, further comprising:
removing, by the second computing device in response to receiving no response to the periodic request for a time period, the first computing device from the trust domain; and
removing, by the second computing device in response to receiving a response to the periodic request that does not include the first computing device component hash value, the first computing device from the trust domain.

20. The method of claim 14, wherein authentication information is generated based on an order identifier for the computing device infrastructure system.

* * * * *